(12) United States Patent
Baier et al.

(10) Patent No.: US 7,672,740 B1
(45) Date of Patent: Mar. 2, 2010

(54) CONDITIONAL DOWNLOAD OF DATA FROM EMBEDDED HISTORIANS

(75) Inventors: John J. Baier, Mentor, OH (US);
Robert J. McGreevy, Oswego, IL (US);
Taryl J Jasper, South Euclid, OH (US);
Robert J. Herbst, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 453 days.

(21) Appl. No.: 11/536,535

(22) Filed: Sep. 28, 2006

(51) Int. Cl.
*G05B 13/02* (2006.01)
(52) U.S. Cl. ...................................................... 700/32
(58) Field of Classification Search ................... 700/11, 700/17, 19, 32, 48, 108, 169, 173; 707/3, 707/102
See application file for complete search history.

(56) References Cited

U.S. PATENT DOCUMENTS

| | | | |
|---|---|---|---|
| 4,510,565 A | 4/1985 | Dummermuth | |
| 4,553,205 A | 11/1985 | Porchia | |
| 4,616,333 A | 10/1986 | Shimoni | |
| 4,718,025 A | 1/1988 | Minor et al. | |
| 4,975,865 A | 12/1990 | Carrette et al. | |
| 5,003,469 A | 3/1991 | Kamiyama et al. | |
| 5,051,932 A | 9/1991 | Inoue et al. | |
| 5,274,781 A | 12/1993 | Gibart | |
| 5,452,201 A | 9/1995 | Pieronek et al. | |
| 5,805,442 A | 9/1998 | Crater et al. | |
| 5,901,323 A | 5/1999 | Milliken et al. | |
| 5,943,675 A | 8/1999 | Keith et al. | |
| 6,110,214 A | 8/2000 | Klimasauskas | |
| 6,139,201 A | 10/2000 | Carbonell et al. | |
| 6,204,782 B1 | 3/2001 | Gonzalez et al. | |
| 6,252,589 B1 | 6/2001 | Rettig et al. | |
| 6,263,487 B1 | 7/2001 | Stripf et al. | |
| 6,298,393 B1 | 10/2001 | Hopsecger | |

(Continued)

FOREIGN PATENT DOCUMENTS

EP 0490864 6/1992

(Continued)

OTHER PUBLICATIONS

European Search Report dated Feb. 22, 2008 for European Patent Application Serial No. EP 07 11 7388, 1 Page.

(Continued)

*Primary Examiner*—Ramesh B Patel
*Assistant Examiner*—Chad Rapp
(74) *Attorney, Agent, or Firm*—Turocy & Watson LLP; William R. Walbrun; John M. Miller

(57) ABSTRACT

Systems and methods that provide for event driven downloading, via defining storage thresholds in an embedded historian (e.g. micro historian). Upon reaching predetermined thresholds (e.g., low/high water marks), stored data in the embedded historians can automatically down load to a central plant historian. An automatic download engine is provided that down loads historian data based on satisfaction of such conditions defined for the download. The download engine can further include a detector component, which detects whether a predetermined condition (e.g., associated with the storage capacity of the micro-historians have been met. Moreover, a notification component can notify the embedded historians that the data have been permanently persisted in the central historian.

29 Claims, 10 Drawing Sheets

U.S. PATENT DOCUMENTS

| | | | |
|---|---|---|---|
| 6,411,987 B1 | 6/2002 | Steger et al. | |
| 6,505,247 B1* | 1/2003 | Steger et al. | 709/224 |
| 6,536,029 B1 | 3/2003 | Boggs et al. | |
| 6,539,271 B2 | 3/2003 | Lech et al. | |
| 6,559,861 B1 | 5/2003 | Kennelly et al. | |
| 6,574,639 B2* | 6/2003 | Carey et al. | 707/104.1 |
| 6,618,856 B2 | 9/2003 | Coburn et al. | |
| 6,633,782 B1 | 10/2003 | Schleiss et al. | |
| 6,754,668 B2 | 6/2004 | Noble et al. | |
| 6,754,885 B1* | 6/2004 | Dardinski et al. | 717/113 |
| 6,795,798 B2 | 9/2004 | Eryurek et al. | |
| 6,799,148 B2 | 9/2004 | Ling et al. | |
| 6,847,850 B2 | 1/2005 | Grumelart | |
| 6,865,644 B2 | 3/2005 | Husted et al. | |
| 6,952,727 B1 | 10/2005 | Lindner et al. | |
| 6,975,913 B2 | 12/2005 | Kreidler et al. | |
| 7,043,311 B2 | 5/2006 | Nixon et al. | |
| 7,069,201 B1 | 6/2006 | Lindner et al. | |
| 7,181,370 B2 | 2/2007 | Furem et al. | |
| 7,206,646 B2 | 4/2007 | Nixon et al. | |
| 7,206,965 B2 | 4/2007 | Roddy et al. | |
| 7,218,974 B2 | 5/2007 | Rumi et al. | |
| 7,228,310 B2 | 6/2007 | O'Brien | |
| 7,249,356 B1 | 7/2007 | Wilson et al. | |
| 7,272,665 B2 | 9/2007 | Yamada et al. | |
| 7,275,062 B2 | 9/2007 | Deitz et al. | |
| 7,286,888 B2 | 10/2007 | Monette et al. | |
| 7,299,367 B2 | 11/2007 | Hamm et al. | |
| 7,328,078 B2 | 2/2008 | Sanford et al. | |
| 7,359,930 B2* | 4/2008 | Jackson et al. | 709/200 |
| 7,574,417 B1 | 8/2009 | McGreevy et al. | |
| 2002/0133523 A1 | 9/2002 | Ambler et al. | |
| 2002/0174263 A1 | 11/2002 | Codd et al. | |
| 2003/0014130 A1 | 1/2003 | Grumelart | |
| 2003/0041135 A1 | 2/2003 | Keyes et al. | |
| 2003/0101208 A1 | 5/2003 | Chauvel et al. | |
| 2003/0172107 A1 | 9/2003 | Leyfer et al. | |
| 2003/0182303 A1 | 9/2003 | Gibson | |
| 2004/0153437 A1 | 8/2004 | Buchan | |
| 2004/0181294 A1 | 9/2004 | Deitz et al. | |
| 2005/0198034 A1 | 9/2005 | Boyer | |
| 2005/0198406 A1 | 9/2005 | Sichner | |
| 2005/0210337 A1* | 9/2005 | Chester et al. | 714/47 |
| 2006/0004827 A1 | 1/2006 | Stuart | |
| 2006/0020928 A1 | 1/2006 | Holloway et al. | |
| 2006/0026559 A1 | 2/2006 | Gunturi et al. | |
| 2006/0067334 A1 | 3/2006 | Ougarov et al. | |
| 2006/0291283 A1 | 12/2006 | Jin et al. | |
| 2006/0294502 A1 | 12/2006 | Das et al. | |
| 2007/0028070 A1* | 2/2007 | Avergun et al. | 711/172 |
| 2007/0050348 A1* | 3/2007 | Aharoni et al. | 707/4 |
| 2007/0073744 A1 | 3/2007 | McVeigh et al. | |
| 2007/0112447 A1 | 5/2007 | McGreevy et al. | |
| 2007/0112801 A1 | 5/2007 | McGreevy et al. | |
| 2007/0136533 A1* | 6/2007 | Church et al. | 711/137 |
| 2007/0142941 A1 | 6/2007 | McGreevy et al. | |
| 2007/0156770 A1* | 7/2007 | Espelien | 707/200 |
| 2007/0244964 A1 | 10/2007 | Challenger et al. | |
| 2007/0282577 A1 | 12/2007 | Lind | |
| 2007/0288795 A1 | 12/2007 | Leung et al. | |
| 2008/0027678 A1 | 1/2008 | Miller | |
| 2008/0082577 A1 | 4/2008 | Hood et al. | |
| 2008/0126408 A1* | 5/2008 | Middleton | 707/104.1 |

FOREIGN PATENT DOCUMENTS

| | | |
|---|---|---|
| EP | 1109107 | 6/2001 |
| EP | 1307823 | 5/2003 |
| GB | 2347234 A | 8/2000 |
| GB | 2353616 A1 | 2/2001 |
| WO | 2004027531 A1 | 4/2004 |
| WO | 2005006130 A | 1/2005 |
| WO | 2005006130 A3 | 1/2005 |

OTHER PUBLICATIONS

"Major Canadian Natural Gas Producer Buys AnyWhere/AnyTime Services from Industrial Evolution" Mar. 12, 2001, Industrial Evolution pp. 1.

Real Time Intelligence at the Source-Deploying and EMbedded Historian. Users Conference 2005, pp. 1.

Miller, et al. "Extending the Reach of Enterprise Data Management in a World of M2M." ISA EXPO. Oct. 2005, pp. 1-7.

"Proficy Historian"; Dec. 16, 2004, GE FANUC, pp. 1-8.

OA dated Dec. 3, 2008 for U.S. Appl. No. 11/536,566, 35 pages.

European Search Report dated Jan. 20, 2009 for European Patent Application No. EP08156281, 6 Pages.

EP Office Action for Application Number 08165215.8-1243 dated Mar. 3, 2009, 2 pages.

European Search Report and Written Opinion for European Application No. EP 08 16 5215, dated Dec. 18, 2008, 6 pages.

Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.

Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.

European Search Report dated Feb 5, 2008 for European Patent Application No. EP07117614, 8 pgs.

ALVESTRAND. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.

European Search Report dated May 5, 2008 for European Patent Application No. EP07117622, 2 pgs.

Power RICH System, Enterprise Edition, Historian (PRS EE Historian) Version 1.5, last accessed Dec. 3, 2008, 15 pages.

Wonderware Plant Intelligence Solution Helps Aria Foods Deliver Fresh Milk Products to the Tables of Europe. Last accessed Dec. 3, 2008, 4 pages.

European Search Report dated Dec. 18, 2007 for European Patent Application Serial No. 07117364.5-2221, 2 Pages.

OA dated Dec. 18, 2008 for U.S. Appl. No. 11/536,522, 15 pages.
OA dated Apr. 3, 2009 for U.S. Appl. No. 11/536,522, 20 pages.
OA dated Jul. 21, 2008 for U.S. Appl. No. 11/536,522, 21 pages.
OA dated Oct. 13, 2009 for U.S. Appl. No. 11/536,522, 22 pages.
OA dated Sep. 16, 2009 for U.S. Appl. No. 11/558,705, 23 pages.
OA dated Apr. 22, 2009 for U.S. Appl. No. 11/558,705, 23 pages.
OA dated Jul 29, 2009 for U.S. Appl. No. 11/558,710, 18 pages.
OA dated Nov. 14, 2008 for U.S. Appl. No. 11/558,710, 18 pages.
OA dated Jul. 28, 2008 for U.S. Appl. No. 11/536,545, 26 pages.
OA dated Dec. 12, 2008 for U.S. Appl. No. 11/536,545, 18 pages.
OA dated Jul. 10, 2009 for U.S. Appl. No. 11/536,545, 30 pages.

* cited by examiner

US 7,672,740 B1

CONDITIONAL DOWNLOAD OF DATA FROM EMBEDDED HISTORIANS

TECHNICAL FIELD

The subject invention relates generally to historian components associated with industrial controllers, and more particularly to conditional download of data collected by embedded historian components, based on a predetermined condition(s) such as respective storage level(s).

BACKGROUND

Manufacturing control and monitoring modules typically produce significant amounts of data. Industrial controller produce both real-time and historical data about the status of a given process including alarms, process values, and audit/error logs. Typically, industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, conventional historian processors enable high-speed real-time data collection by communicating directly with the control processor across the backplane for fast data collection speeds. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

Moreover, process control workstation displays can show the current state of process variables to an operator, and historical trend objects can display historical data from a persistent store such as a database or log file. Such data can be collected and recorded via historians, which are industrial computer(s) associated with the controller backplane.

Nonetheless and in contrast to PC historians, when employing embedded historian components that supply a direct interface to controllers, data backup, and risk of loss for data stored on a RAM residing on such embedded historians can create complexities. The size of the RAM in such embedded historians is limited and can eventually overload. In general an operator should periodically upload the data to remove it from the historian memory to avoid overloading.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for systems and methods of event driven downloading, via defining storage thresholds in an embedded historian(s), wherein upon reaching such predetermined threshold (e.g., low/high water marks), stored data in embedded historians can automatically down load to a central plant historian. In general, such embedded historians (unlike conventional PC historians) supply a direct interface to controllers without employing a transitional layer, and hence provide a substantially higher data exchange rate as compared to conventional PC historians. An automatic download engine is provided that down loads historian data, based on satisfaction of such conditions defined for the download. The download engine of the subject invention can include a detector component, which detects whether a predetermined condition (associated with the storage capacity of the embedded historians have been met. Moreover, a notification component can notify the embedded historians that the data have been permanently persisted in the central historian.

Accordingly, event driven down loads can be enabled based on memory usage and/or other predetermined events. For example, various levels of storage capacity for an embedded historian can be associated with a full level and an empty level—wherein the embedded historian (e.g., micro-historian) can down load itself to the plant historian (e.g., a central plant) upon reaching a full level. Subsequently, the central plant historian can persistently store such data, and send a confirmation signal on a secure channel (e.g., a trusted confirmation signal) to the embedded historian. Upon receipt of such confirmation, the embedded historian can avail its memory for data override. Such an arrangement can reduce data backup, and mitigate risk of loss for data stored on a RAM, wherein size of the RAM in such embedded historians is limited and can eventually overload, for example.

In a related methodology, data can be initially stored via embedded historians, wherein such storage can continue until a predetermined threshold is reached. Upon reaching such predetermined threshold, the automatic download component can download stored data in such embedded historians to a central plant historian. Upon completion of data transfer to the central plant historian, then a trusted confirmation signal can be sent to the embedded historians for indicating that the data is persisted, and hence data in the embedded historians can be purged. Moreover, various artificial intelligence component to predict and/or infer whether predetermined thresholds have been satisfied.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
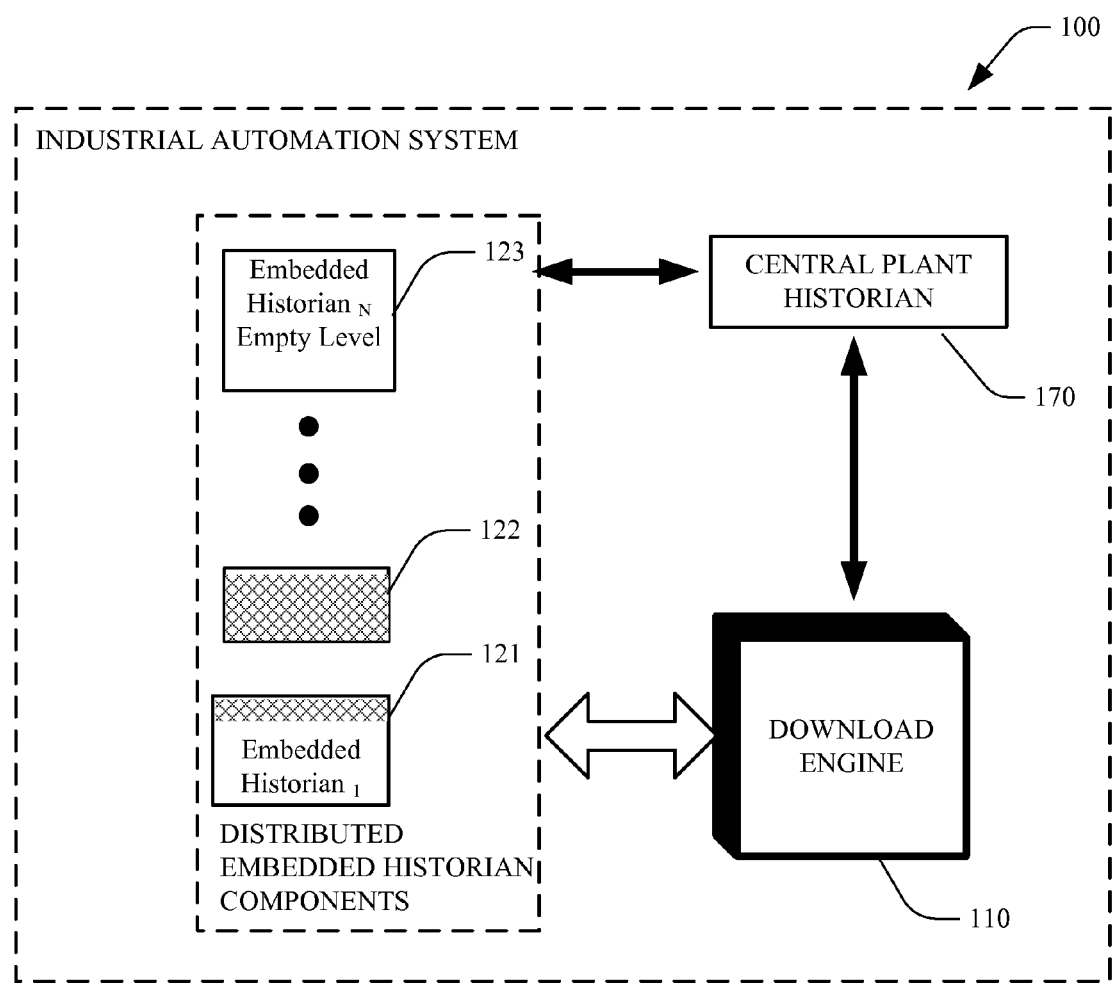
FIG. 1 is a schematic block diagram of an industrial automation system with embedded historians and a down load engine that downloads data based on satisfaction of predefined thresholds in accordance with an aspect of the subject innovation.

FIG. 1 illustrates a download engine 110 that is associated with a plant embedded historian network of an industrial automation system 100 (e.g., a network of controller devices), to facilitate download of data based on predetermined criteria such as parameters relating to storage capacity of the embedded (e.g., micro) historians 121, 122, 123 (1 to N, N being an integer). In contrast to conventional PC historians, embedded historians (e.g., micro historians) of the subject innovation are special purpose historians that reside in a backplane and supply direct interface (e.g., without a transition layer) to controllers and/or associated industrial units. Such embedded historians employ industrial specifications (e.g., regarding shock vibration, sealing, contamination proofing, and the like), and supply substantially higher data exchange speed as compared to conventional PC historians. Such download engine 110 can download from each embedded historian 121, 122, 123 respective stored data, wherein the embedded historians are distributed on the back plane of an industrial network. The download engine 110 can be part of applications running on a control unit, which can function as a management control center for the industrial automation system 100. Accordingly, a distributed embedded historian framework is provided, wherein a plurality of historical data types can be stored, collected and subsequently downloaded to a central plant historian 170. The download engine 110 initiates the download upon satisfaction of predetermined criteria; for example such as storage capacity of the embedded historians reaching a predetermined value.

Such download threshold criteria associated with the download engine 110 can determine whether to commence, pause, resume and/or halt data transfer on any embedded historian 121, 122, 123 that requests data exchange with the central plant historian 170, for example. As depicted, the embedded historian 121 has a storage capacity that is partially full; embedded historian 122 is substantially full and storage capacity of embedded historian 123 is at an empty level. Such storage capacity can be employed as criteria for downloading data to the central plant historian; (e.g., immediately download substantially full embedded historians, down load after a predetermined duration embedded historians that have half of their storage capacity filled, and the like.) Such an arrangement can reduce data backup, and mitigate risk of loss for data stored on a RAM, wherein size of the RAM in such microhistorians is limited and can eventually overload, for example.

Typically, when a message transfer session (e.g., a connection) is initiated for download of historian data 121, 122, 123; the download engine 110 can generate a connection instance to the central plant historian for the download session. The connection instance can be populated with information indicative of the embedded historian 121, 122, 123, the type of data for download, identifying message(s), and/or a connection ID (e.g., a keep-alive message), for example. Such information can be utilized to begin data transfer between the embedded historians 121, 122, 123 and the central plant historian 170. Furthermore, the connection ID can further be employed to track message transmission within the embedded historians, download engine, and central plant historian 170.

The established connection instance between the embedded historians 121, 122, 123 and the central plant historian 170 can additionally be dynamically updated, to reflect transmission progress and provide transmission history. For example, indicia indicative of any portions—(including the entire message or data download)—that have been transmitted successfully or failed can be associated with such connection instance. Transmission history can include information related to transfer commencement and completion, pauses and resumes, the level of communication activity errors, resubmissions, changes in the servicing machine, and the like. It is to be appreciated that any number of embedded historians can request download transfer connection to the central plant historian 170.

A network system (not shown) can be associated with the industrial automation system 100, which can be employed via the download engine 110. The network system can further include additional hosts (not shown), which may be personal computers, servers or other types of computers. Such hosts are generally capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters. Moreover, the network system can be, for example, an Ethernet LAN, a token ring LAN, or other LAN, or Wide Area Network (WAN). Also, the network system can include hardwired and/or optical and/or wireless connection paths. The download engine 110 can supply data exchange between the micro historians and the central plant historian 170, to supply information such as: portions of the data that are to be downloaded to the central plant historian, from each of the micro historians.

It is noted that as used in this application, terms such as "engine" "component," "hierarchy," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 2:
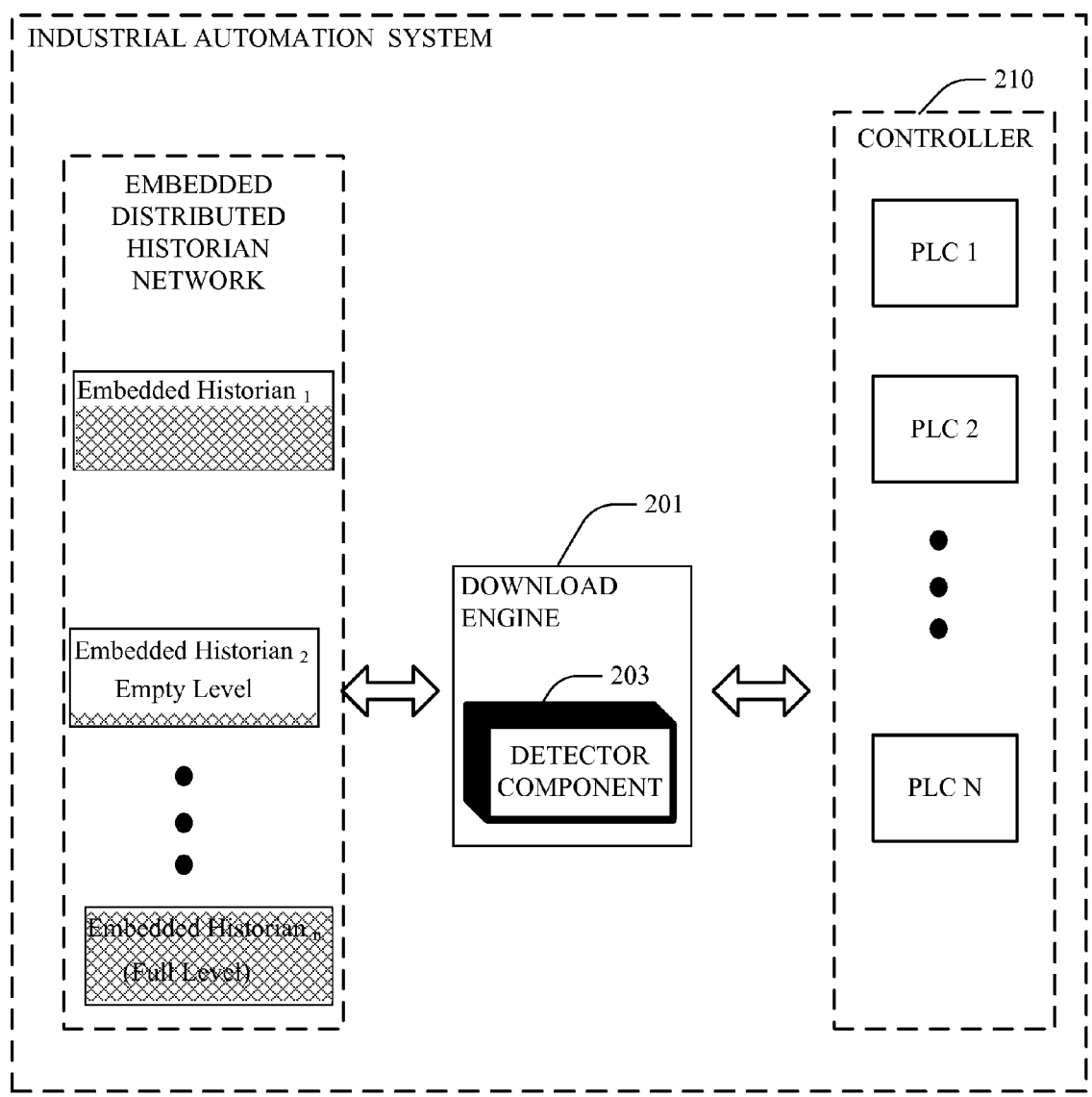
FIG. 2 illustrates a network of embedded historians within an industrial setting that interact with an automatic download engine in accordance with an aspect of the subject innovation.

FIG. 2 illustrates a download engine 201 that can manage download of applications by employing a detector component 203 that detects whether a condition associated with a download of data from a distributed embedded historian network has been satisfied. For example, such condition can relate to a storage capacity of an embedded historian reaching a predetermined storage level (e.g., a percentage capacity of the historian being reached). Accordingly, event driven down loads can be enabled via the detector component 203 based on memory usage and/or other predetermined events. For example, various levels of storage capacity for a micro-historian can be associated with a full level and an empty level. The embedded historian can down load itself to the plant historian (not shown) upon reaching a full level. It is to be appreciated that the download engine 201 can be part of an application that runs on a control unit 210 of the industrial plant.

Figure 3:
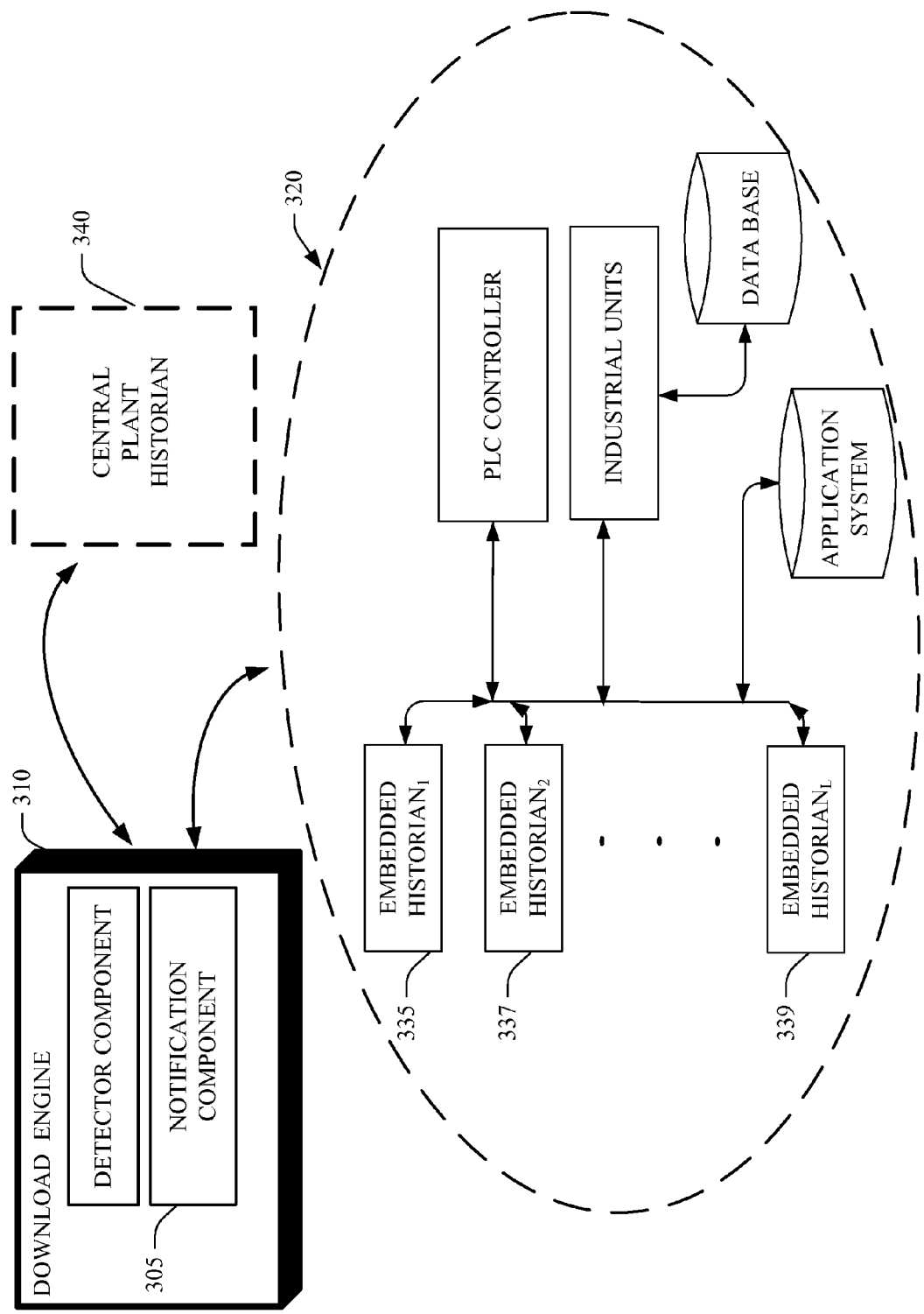
FIG. 3 illustrates a general block diagram of a download engine that further includes a notification component in accordance with an aspect of the subject innovation.

FIG. 3 illustrates a general block diagram of a download engine 310 that further includes a notification component 305, in accordance with an aspect of the subject innovation. Upon a successful download of the embedded historian data to central plant historian 340, the notification component 305 can notify the embedded historians 335, 337, 339 (1 to L, L being an integer) that the data have been permanently persisted in the central plant historian 340. Upon receipt of such confirmation, the embedded historians 335, 337, 339 can avail their memory for data override. Such an arrangement can reduce data backup, and mitigate risk of loss for data stored on a RAM, wherein size of the RAM in such embedded historians 335, 337, 339 is limited and can eventually overload, for example.

For example, data can be initially stored via embedded historians 335, 337, and 339, and such storage can continue until predetermined threshold storage capacities associated with these embedded historians are reached. Upon reaching such predetermined threshold, the download engine 310 can download the embedded historian data to the central plant historian 340. After completion of the data transfer to the central plant historian 340, the notification component 305 can send a trusted confirmation signal to the embedded historians 335, 337, 339 to indicate that the data is properly persisted, and hence data in the embedded historians 335, 337, and 339 can be purged.

Figure 4:
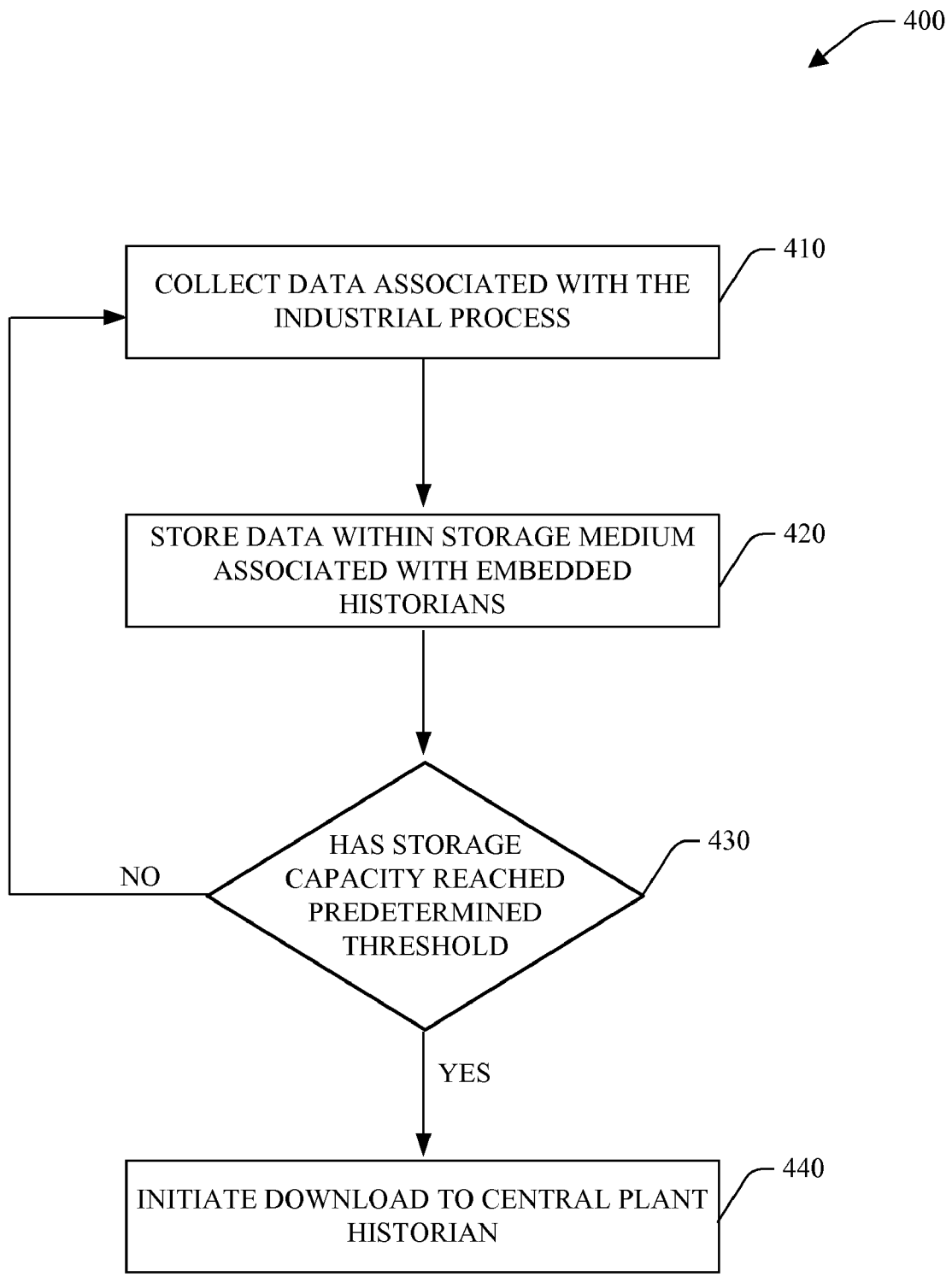
FIG. 4 illustrates a methodology of downloading historian data in accordance with an aspect of the subject invention.

FIG. 4 illustrates a methodology 400 of downloading historian data in accordance with an aspect of the subject invention. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Initially and at 410, a plurality of embedded historians within the industrial plant can collect data that is related to an industrial operation. Such collected data can subsequently be stored in a storage medium associated with the embedded historians at 420. Next, and at 430 a determination is made as to whether the storage capacity has reached a predetermined storage. If so, the methodology proceeds to act 440, and a download to the central plant can be initiated. Otherwise, the methodology 400 proceeds to act 410 wherein additional data associated with the industrial process can be collected.

Figure 5:
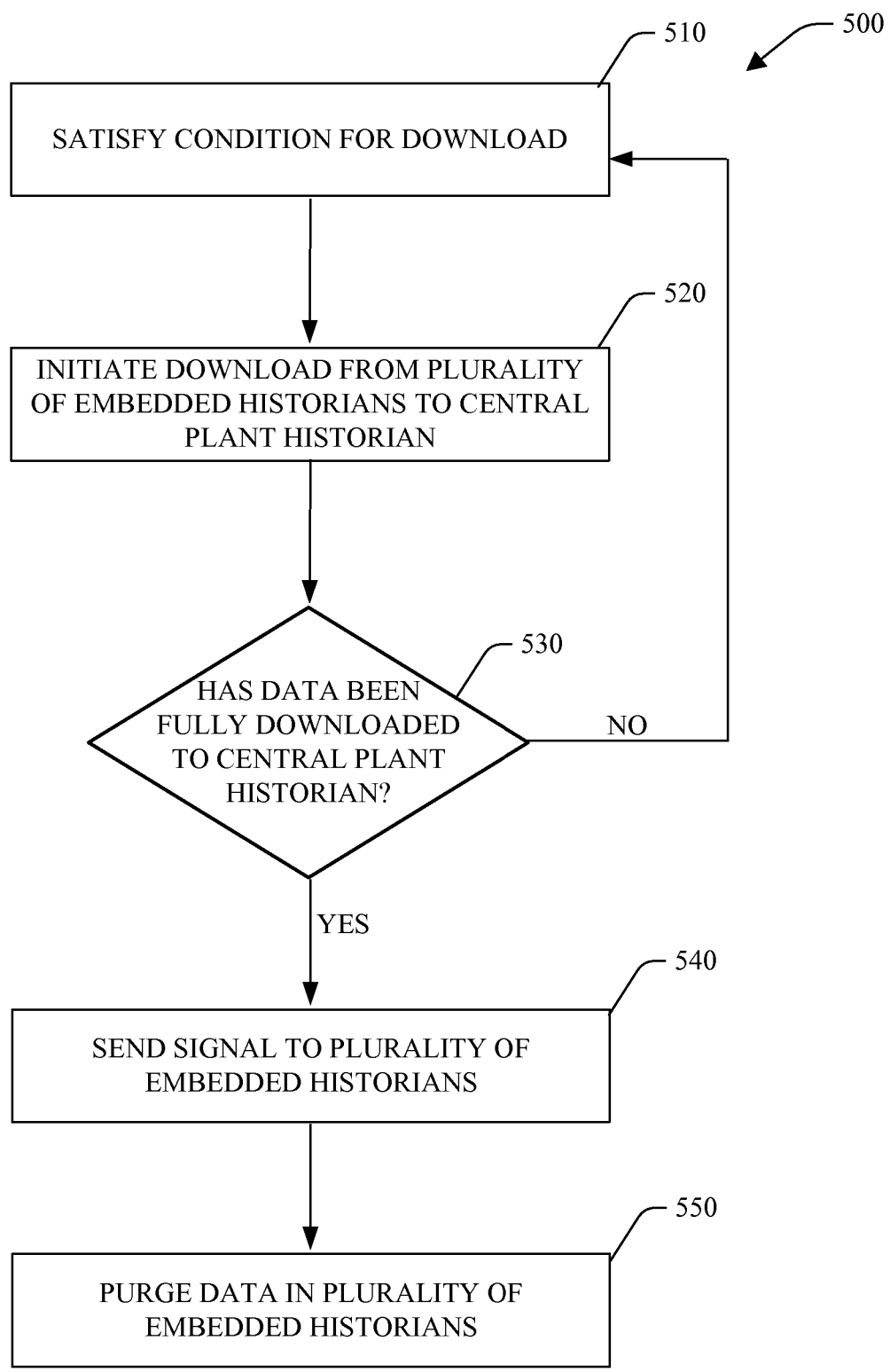
FIG. 5 illustrates a related download methodology in accordance with a particular aspect of the subject innovation.

FIG. 5 illustrates a related methodology 500 in accordance with a particular aspect of the subject innovation. Initially and at 510 a predetermined condition for download is satisfied. For example, various levels of storage capacity for an embedded historian (e.g., micro-historian) can be employed as such download condition, such as for example, a full level and an empty level. Next, and at 520 the embedded historian can down load itself to the central plant historian (e.g., upon reaching a full level.) Subsequently, a determination is performed at 530 to verify that the data transfer is completed, and data is fully downloaded to the central plant historian. The plant historian can persistently store such data and send a confirmation signal on a secure channel (e.g., a trusted confirmation signal) to the embedded historian(s) at 540. Upon receipt of such confirmation, the embedded historian(s) can avail its memory for data override, and hence data in the embedded historian(s) can be purged. Such an arrangement can reduce data backup, and mitigate risk of loss for data stored on a RAM, wherein size of the RAM in such microhistorians is limited and can eventually overload, for example.

Figure 6:
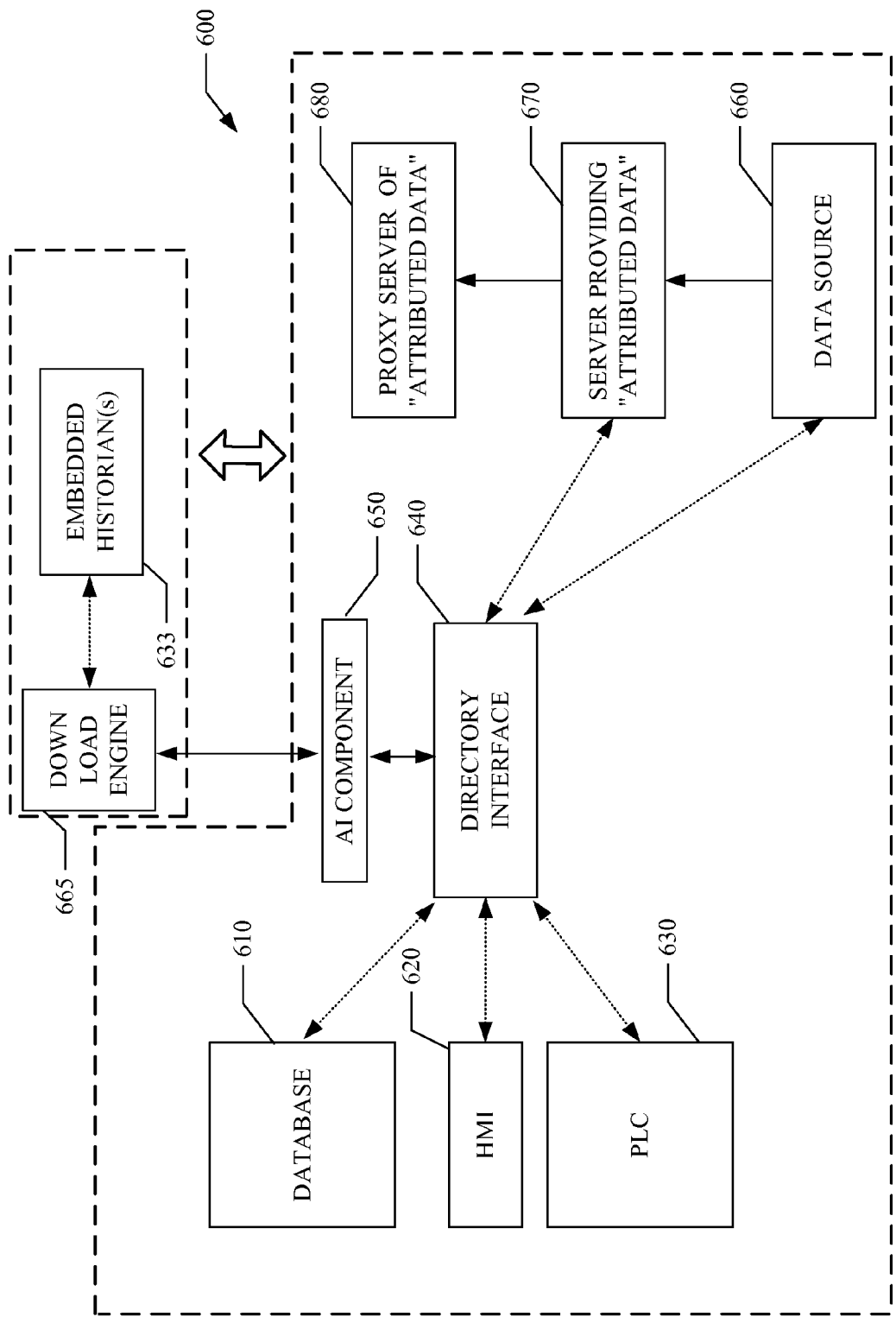
FIG. 6 illustrates an exemplary industrial automation network that employs an embedded historian component with downloads to a central plant historian in accordance with an aspect of the subject innovation.

FIG. 6 illustrates an exemplary industrial automation network that employs a embedded historian component 633, to enable high speed data collection (e.g., real time) from the industrial setting 600, which can include a database 610, a human machine interface (HMI) 620 and a programmable logic controller (PLC) 630, and a directory interface 640. The directory interface 640 can further associate with an Artificial Intelligence (AI) component 650 to facilitate efficient identification of desired data within a particular network/application. For example, in connection with facilitating the download and/or selection of an embedded historian for download, the subject innovation can employ various artificial intelligence schemes. A process for learning explicitly or implicitly whether data from an embedded historian should be downloaded, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$. As shown in FIG. 5, an artificial intelligence (AI) component 650 can be employed to facilitate inferring and/or determining when, where, how to initiate a download from the plurality of embedded historians to the central plant historian. The AI component 650 can employ any of a variety of suitable AI-based schemes as described supra in connection with facilitating various aspects of the subject invention.

Moreover, the directory interface 640 can be employed to provide data from an appropriate location such as the data source 660, a server 670 and/or a proxy server 680. Accordingly, the directory interface 640 can point to a source of data based upon role and requirements (needs) of a requester (e.g., database 610, HMI 620, PLC 630, and the like.) The database 610 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. Accordingly, particular ERP applications can require data that has certain desired attributes associated therewith. Thus, in accordance with an aspect of the subject invention, the directory interface 640 can provide data to the database 610 from the server 670, which provides data with the attributes desired by the database 610.

As illustrated in FIG. 6, the embedded historian 633 can leverage directory interface 640 and other Unified Plant Model (UPM) services to facilitate collection and download of history data to a central plant historian (not shown), via the download engine 665. Such download engine 665 can automatically download historian data based on satisfaction of pre-defined conditions (e.g., related to storage capacity of the embedded historians) defined for the download.

Moreover, the HMI 620 can employ the directory interface 640 to point to data located within the system 600. The HMI 620 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 620 can request data to have particular visualization attributes associated with data in order to easily display such data thereto. For example, the HMI 620 can query the directory interface 640 for a particular data point that has associated visualization attributes. The directory interface 640 can determine that the proxy server 680 contains the attributed data point with the desired visualization attributes. For instance, the attributed data point can have a particular graphic that is either referenced or sent along with the data such that this graphic appears within the HMI environment instead of or along with the data value.

The PLC 630 can be any number of models such as Allen Bradley PLC5, SLC-500, MicoLogix, and the like. The PLC 630 is generally defined as a specialized device employed to provide high-speed, low-level control of a process and/or system. The PLC 630 can be programmed using ladder logic or some form of structured language. Typically, the PLC 630 can utilize data directly from a data source (e.g., data source 660) that can be a sensor, encoder, measurement sensor, switch, valve and the like. The data source 660 can provide data to a register in a PLC, and such data can be stored in the PLC if desired. Additionally, data can be updated (e.g., based on a clock cycle) and/or output to other devices for further processing.

Figure 7:
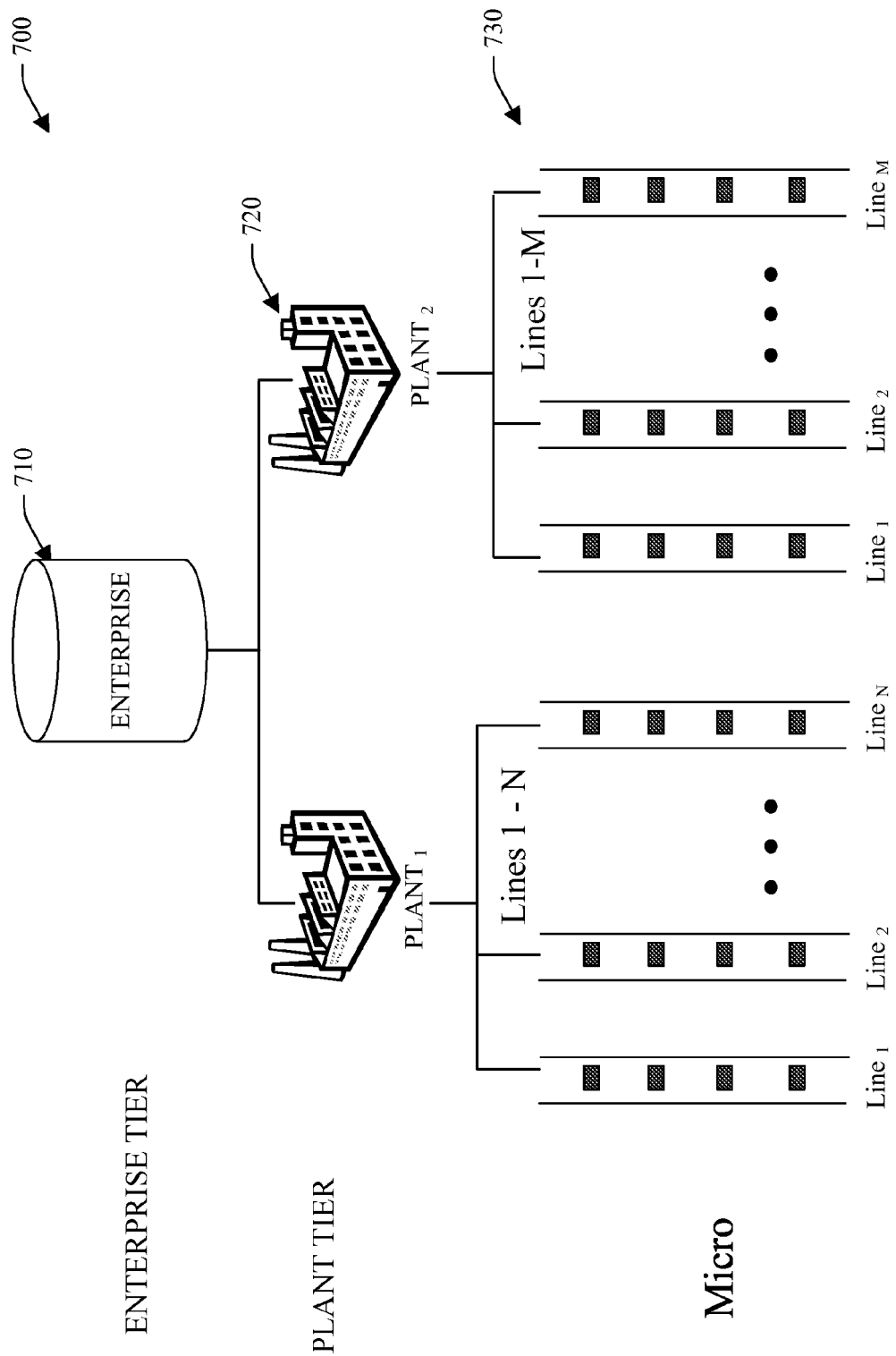
FIG. 7 illustrates an exemplary multi-tiered and distributed embedded historian system that can download history data to a central plant historian, in accordance with an aspect of the subject innovation.

FIG. 7 illustrates an exemplary multi-tiered and distributed historian system 700 that can download history data to a central plant historian, in accordance with an aspect of the subject innovation. The exemplary system 700 illustrates three tiered historian level, wherein the highest data collection tier is illustrated and can be referred to as the enterprise tier 710. This tier aggregates data collected from lower level tiers such as from a plant tier 720 and a micro or embedded tier 730. The tiers 710 and 720 can include archival or permanent storage capabilities. In the system 700, data can be collected from two plants at the tier 720, and from a plurality of historian components at tier 730. It is to be appreciated that such an arrangement is exemplary in nature, and other arrangements are well within the realm of the subject innovation.

Typically, the system 700 can be viewed as a Distributed Historian that spans machines, plants, and enterprises. At level 730, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling within a network that has a low communications bandwidth, for example. The plant level 720 aggregates data from Micro or rack-embedded Historians and/or other data sources (e.g., Live Data source). Such can include plant-level querying, analytics, reporting while efficiently storing, retrieving, and managing large amounts of data. Such level can also auto-discover data and data model context from Micro Historians located at level 730. Other features of the system 700 can include analysis components, logical units, components for interaction with report elements, embeddable presentation components, replication of configuration, storage, archiving, data compression, summarization/filtering, security, and scalability.

Moreover, such system 700 enables combining organizational information such as an organizational or hierarchical data model which represents a common model of a plant that can be based in the S88 or S95 model, for example, and is distributed among computers of the enterprise and industrial controllers, for example. The model can be viewed as an Organizational Data Model—a tree-like hierarchical and heterogeneous structure of organizational Units. For instance, respective Organizational Units can include other Organizational Units. Organizational Units can be either physical locations (e.g., Site, Area) or logical grouping node or collection (e.g., Enterprise as a collection of Sites). The nodes in the organizational hierarchy or model can have associated items representing the plant's production and control equipment, tags, backing tags (e.g., Alarm & Event and the like), programs, equipment phases, I/O devices, and other application related entities. These organizational units thus can form an application view of the user's system.

Figure 8:
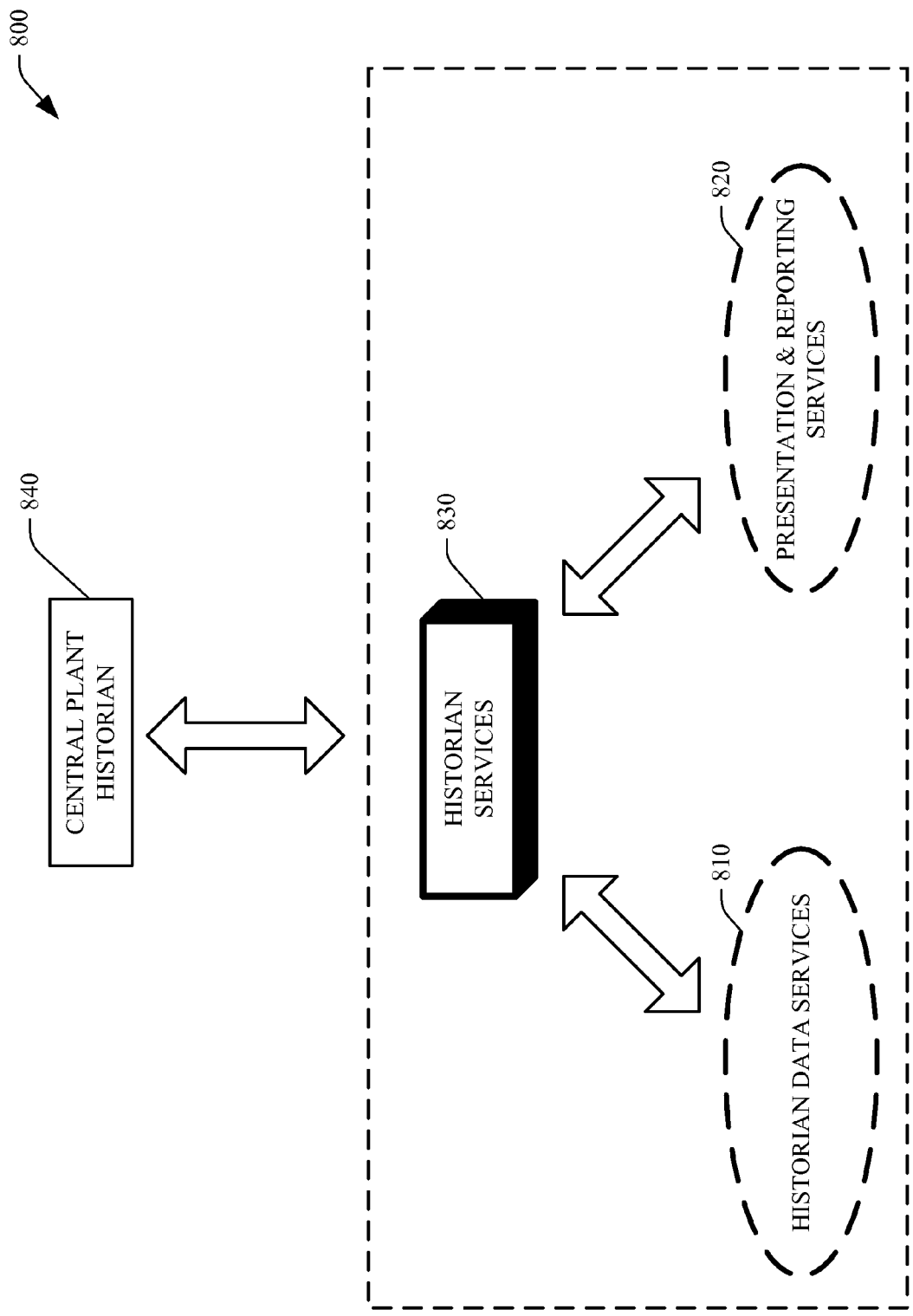
FIG. 8 illustrates historian services that include historian data services and presentation and reporting services, which can employ a download in accordance with an aspect of the subject innovation.

FIG. 8 illustrates historian services 800 for download to a central plant historian 840. The historian services 800 can include historian data services 810 and presentation and reporting services 820. Historian Data Services 810 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 820 (PRS) can supply generic, customizable services for collating and presenting data in a common plant model-defined context. This can include access to stored data, analysis/calculators and query mechanisms, and embeddable, interactive presentation components (e.g., text, charts, SPC). The service 810 can generate reports with various means of presentation/distribution (e.g., web, email) having export capabilities to standard formats (e.g., XML, Excel). The system 800 can employ a download engine as described in detail supra to download history data to a central plant historian 840, in accordance with an aspect of the subject innovation. Additionally, a polling/publication arrangement can also be employed wherein the historians (e.g., micro-historians) identify themselves to the download engine upon occurrence of a predetermined event, and/or periodically. For example, a publish and subscribe component can identify historians to the download engine.

Figure 9:
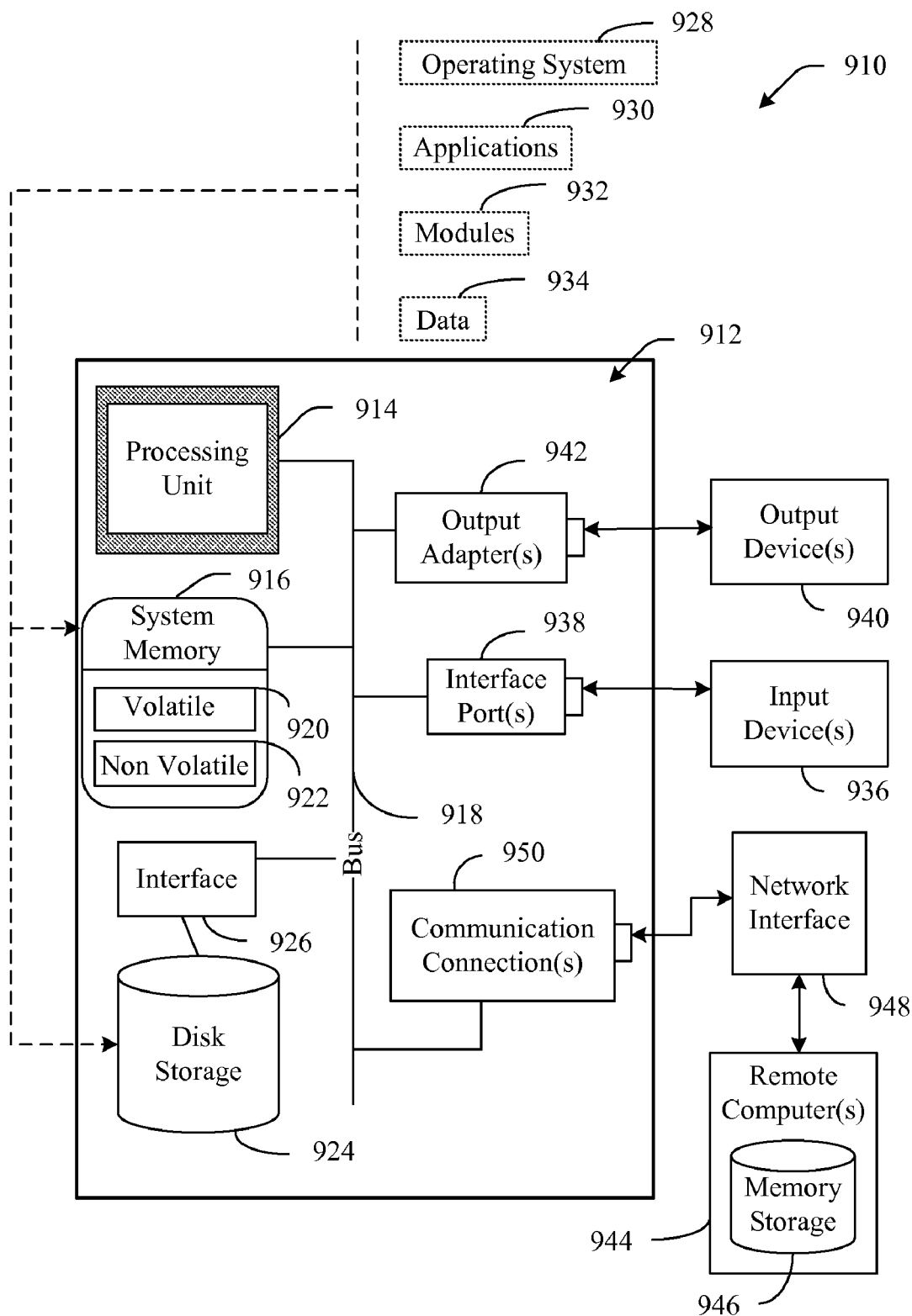
FIG. 9 illustrates an exemplary environment for implementing various aspects of the subject innovation.

With reference to FIG. 9, an exemplary environment 910 for implementing various aspects of the download engine, which includes a computer 912, as part of the download engine. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Figure 10:
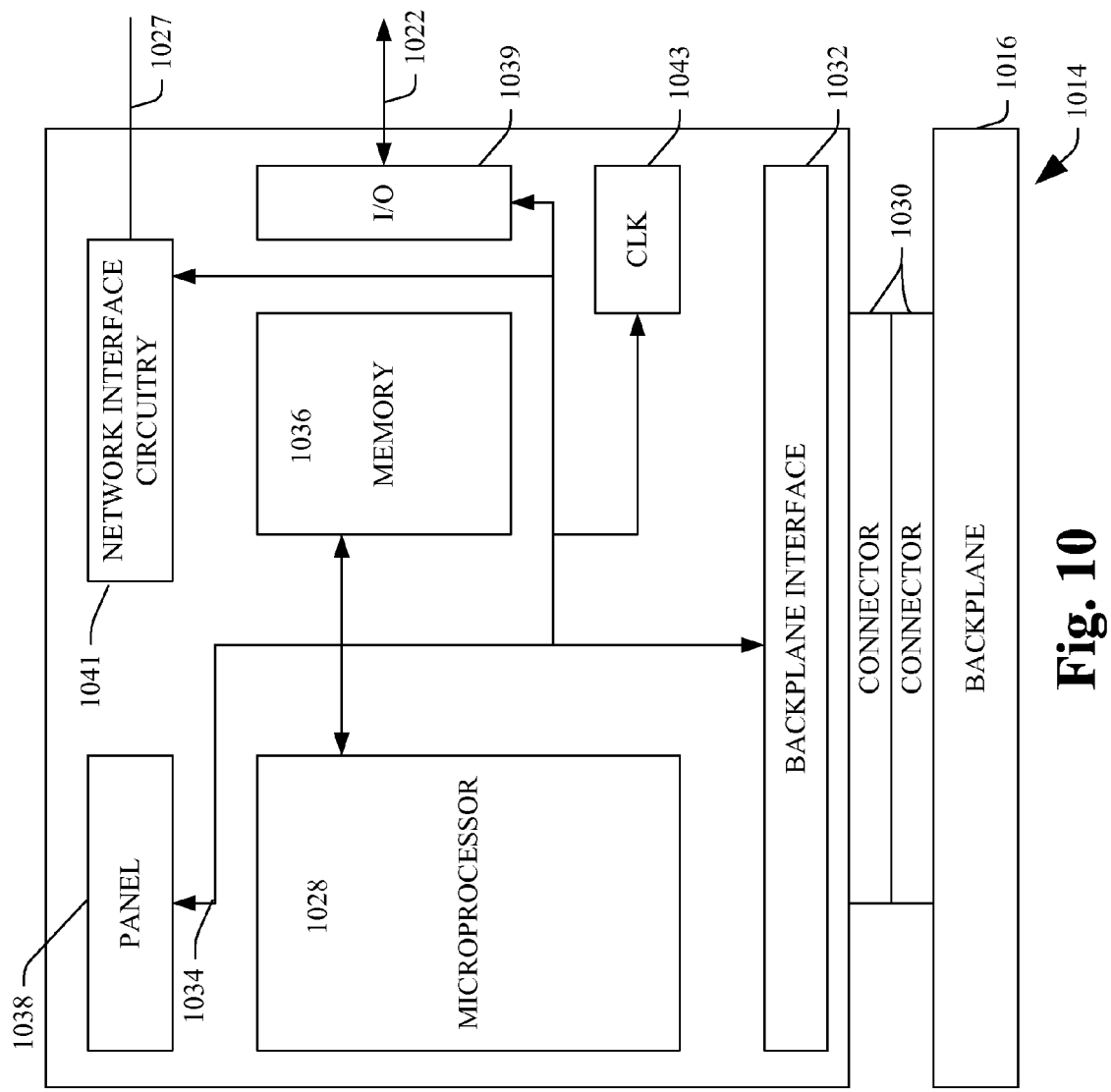
FIG. 10 illustrates an exemplary module and backplane arrangement that various aspects of the subject innovation can be implemented therein.

FIG. 10 also illustrates an exemplary environment that can employ a download in accordance with various aspects of the subject innovation. Each functional module 1014 is attached to the backplane 1016 by means of a separable electrical connector 1030 that permits the removal of the module 1014 from the backplane 1016 so that it may be replaced or repaired without disturbing the other modules 1014. The backplane 1016 provides the module 1014 with both power and a communication channel to the other modules 1014. Local communication with the other modules 1014 through the backplane 1016 is accomplished by means of a backplane interface 1032 which electrically connects the backplane 1016 through connector 1030. The backplane interface 1032 monitors messages on the backplane 1016 to identify those messages intended for the particular module 1014, based on a message address being part of the message and indicating the message destination. Messages received by the backplane interface 1032 are conveyed to an internal bus 1034 in the module 1014.

The internal bus 1034 joins the backplane interface 1032 with a memory 1036, a microprocessor 1028, front panel circuitry 1038, I/O interface circuitry 1039 and communication network interface circuitry 1041. The microprocessor 1028 can be a general purpose microprocessor providing for the sequential execution of instructions included within the memory 1036 and the reading and writing of data to and from the memory 1036 and the other devices associated with the internal bus 1034. The microprocessor 1028 includes an internal clock circuit (not shown) providing the timing of the microprocessor 1028 but may also communicate with an external clock 1043 of improved precision. This clock 1043 may be a crystal controlled oscillator or other time standard including a radio link to an external time standard. The precision of the clock 1043 may be recorded in the memory 1036 as a quality factor. The panel circuitry 1038 includes status indication lights such as are well known in the art and manually operable switches such as for locking the module 1014 in the off state.

The memory 1036 can comprise control programs or routines executed by the microprocessor 1028 to provide control functions, as well as variables and data necessary for the execution of those programs or routines. For I/O modules, the memory 1036 may also include an I/O table holding the current state of inputs and outputs received from and transmitted to the industrial controller 1010 via the I/O modules 1020. The module 1014 can be adapted to perform the various methodologies of the innovation, via hardware configuration techniques and/or by software programming techniques.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising: a hierarchical data model with nodes that represent units associated with the industrial automation system;
a plurality of embedded historians that collect data associated with the industrial automation system, at least one of the embedded historians directly interfaces with at least one controller of the industrial automation system;
a download engine that downloads the data from the at least one of the embedded historians to a central plant historian upon the satisfaction of the predetermined criteria; and a publish and subscribe component that identifies the at least one of the embedded historians to the download engine upon satisfaction of the predetermined criteria.

2. The industrial automation system of claim 1, the predetermined criteria is based upon storage capacity of the embedded historians.

3. The industrial automation system of claim 1, the download engine further comprising a detector component that detects satisfaction of the predetermined criteria.

4. The industrial automation system of claim 1, the download engine further comprising a notification component that notifies the at least one of the embedded historians of completion of download to the central plant historian.

5. The industrial automation system of claim 4, wherein upon the notification to an embedded historian of the successful completion of the download to the central plant historian, memory of the embedded historian avails itself for data override.

6. The industrial automation system of claim 1 further comprising an artificial intelligence component that facilitates initiation of download to the central plant historian.

7. The industrial automation system of claim 1 further comprising a Human Machine Interface (HMI) to graphically display a view of the industrial automation system.

8. The industrial automation system of claim 1 further comprising a graphical user interface (GUI) that forms an application view of a historian data collection and download system.

9. The industrial system of claim 1, the hierarchical organizational data model facilitates data identified for historian purposes to be automatically collected and downloaded.

10. The industrial system of claim 1, the embedded historian associates with at least one of: a module in a chassis, a server, a sensor, or a factory component.

11. The industrial automation system of claim 1, the embedded historians reside in a backplane with the at least one controller of the industrial automation system.

12. The industrial automation system of claim 11, the embedded historians employ industrial specifications including at least one of: shock vibration, sealing, or contamination proofing.

13. The industrial automation system of claim 1, the download engine generates a connection instance for the download.

14. The industrial automation system of claim 13, the connection instance is populated with information indicative of the at least one of the embedded historians corresponding to the download.

15. The industrial automation system of claim 14, the information indicative of the at least one of the embedded historians includes one or more of: a connection identifier, an identifying message, or type of data for download.

16. A method of managing embedded historians within an industrial plant comprising: representing industrial units associated with the industrial plant as nodes in a hierarchical data model;
collecting data via a plurality of volatile memory embedded historians;
detecting that a predetermined condition associated with one or more of the embedded historians has been satisfied;
identifying the one or more of the embedded historians to a central plant historian upon occurrence of the predetermined condition;
downloading the data to a central plant historian upon occurrence of the predetermined condition;
persisting data in the central plant historian;
notifying the one or more of embedded historians regarding the success or failure of the persistence of the data in the central historian; and
purging the data from the one or more of embedded historians upon notification of the successful persistence of the data in the central historian.

17. The method of claim 16 further comprising determining that a predetermined storage capacity of the one or more of the embedded historians has reached a predetermined threshold.

18. The method of claim 16 further comprising availing the volatile memory to data in the one or more of the embedded historians after notification of successful persistence of data to the central historian.

19. The method of claim 16 further comprising defining a common organizational data model for the industrial plant.

20. The method of claim 16 further comprising collecting historian data across various levels of the industrial plant.

21. The method of claim 16 further comprising employing a polling mechanism for embedded historian detection and identification.

22. The method of claim 16 further comprising incorporating an embedded historian as part of a controller.

23. A computer implemented system comprising the following computer executable components:
a download engine that downloads data from an embedded historian to a central plant historian upon a storage capacity of the embedded historian reaching a predetermined level, the embedded historian directly interfaces a control unit of an industrial plant; a hierarchical data model with nodes that represent units associated with the industrial plant;
a detector component associated with the download engine to detect occurrence of the predetermined level;
a publish and subscribe component to identify the embedded historian to the download engine upon the embedded historian reaching the predetermined level; and
a notification component that sends a trusted confirmation to the embedded historian upon the successful persistence of the downloaded data in the central historian.

24. The computer implemented system of claim 23 further comprising a notification component that notifies the embedded historian of download completion.

25. The computer implemented system of claim 23 further comprising a data base that services an industrial plant.

26. The computer implemented system of claim 23, the download engine is part of an application that runs on a control unit of an industrial plant.

27. An industrial controller system comprising:

means for collecting and retaining data through a direct interface to an industrial process; means for representing industrial units associated with the industrial process as nodes in a hierarchical data model;

means for downloading the data to a central location collecting data upon satisfaction of a predetermined condition;

means for identifying the data upon satisfaction of the predetermined condition;

means for detecting satisfaction of the predetermined condition;

means for transmitting a successful download to the central location collecting data through a trusted confirmation; and means for purging the retained data directly collected through the direct interface with the industrial process after the transmission of the trusted confirmation.

28. The industrial controller system of claim 27 further comprising means for graphically displaying a view of an industrial automation system.

29. The industrial controller system of claim 27 further comprising means for representing industrial units associated with an industrial plant as nodes in the hierarchical data model.

* * * * *